(12) United States Patent
Parks et al.

(10) Patent No.: US 7,364,115 B2
(45) Date of Patent: Apr. 29, 2008

(54) SYSTEM AND METHOD FOR CONTROLLING ENGINE RPM OF A DUCTED FAN AIRCRAFT

(75) Inventors: Robert Parks, San Jose, CA (US); Jean-Charles Ledé, Manassas, VA (US); Mark Drela, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 11/228,390

(22) Filed: Sep. 19, 2005

(65) Prior Publication Data

US 2006/0097107 A1 May 11, 2006

Related U.S. Application Data

(60) Provisional application No. 60/610,565, filed on Sep. 17, 2004.

(51) Int. Cl.
*B64C 29/00* (2006.01)

(52) U.S. Cl. .............. 244/12.4; 244/23 A; 244/23 D; 244/73 R

(58) Field of Classification Search .............. 244/12.4, 244/12.5, 23 R, 23 D, 73 R, 23 A
See application file for complete search history.

(56) References Cited

U.S. PATENT DOCUMENTS

| | | | |
|---|---|---|---|
| 2,058,678 A | 10/1936 | Fry | |
| 2,328,786 A | 9/1943 | Crowder | |
| 2,347,230 A | 4/1944 | Zuck | |
| 2,397,632 A | 4/1946 | Stuart | |
| 2,444,781 A | 7/1948 | Leonard | |
| 2,477,637 A * | 8/1949 | Mercier | ........................ 244/15 |
| 2,479,125 A | 8/1949 | Leonard | |
| 2,622,826 A | 12/1952 | Prince | |
| 2,712,420 A | 7/1955 | Amster et al. | |
| 2,848,180 A * | 8/1958 | Ploger | ........................ 244/12.5 |
| 2,866,608 A | 12/1958 | Leonard | |
| 2,959,373 A | 11/1960 | Zuck | |

(Continued)

OTHER PUBLICATIONS

"UAVs Demonstrate the Future at Pax River Event" Garamone, Jim, Jul. 14, 2003, American Press Service http://www.defenselink.mil/news/Jul2003/n07142003_200307144.html.*

(Continued)

*Primary Examiner*—Teri P. Luu
*Assistant Examiner*—Joseph W Sanderson
(74) *Attorney, Agent, or Firm*—Katten Muchin Rosenman LLP; Mark W. Hrozenchic; Richard P. Bauer

(57) ABSTRACT

An aircraft including a ducted fan and an engine for driving the ducted fan includes a plurality of vanes movably mounted to the aircraft at a substantially rectangular exhaust end of the aircraft. Each of the plurality of vanes is substantially rectangular or square. The plurality of vanes are configured to alter an exit area of the exhaust end. The aircraft includes a sensor circuit for detecting a RPM of the engine and for outputting a RPM signal. The aircraft includes a control circuit coupled to the sensor circuit and the plurality of vanes. The control circuit is configured to actuate the plurality of vanes to alter the exit area of the exhaust end to vary a pressure load on the ducted fan to control the RPM of the engine in response to the RPM signal.

25 Claims, 8 Drawing Sheets

U.S. PATENT DOCUMENTS

| | | | |
|---|---|---|---|
| 2,994,493 A * | 8/1961 | Hartman | 244/12.6 |
| 3,096,952 A | 7/1963 | Roppel | |
| 3,100,377 A * | 8/1963 | Kosin et al. | 239/265.19 |
| 3,142,455 A | 7/1964 | Wilford | |
| 3,166,271 A | 1/1965 | Zuck | |
| 3,169,728 A * | 2/1965 | Langfelder et al. | 244/23 R |
| 3,179,353 A * | 4/1965 | Peterson | 244/12.3 |
| 3,258,206 A * | 6/1966 | Simonson | 239/265.27 |
| 3,350,035 A | 10/1967 | Schlieben | |
| 3,415,469 A | 12/1968 | Spratt | |
| 3,475,913 A * | 11/1969 | Mortlock et al. | 60/229 |
| 3,730,459 A | 5/1973 | Zuck | |
| 3,806,068 A * | 4/1974 | Blythe et al. | 244/53 R |
| 3,987,981 A * | 10/1976 | Kook | 244/12.5 |
| 4,005,835 A | 2/1977 | Gerstine et al. | |
| 4,037,405 A | 7/1977 | Huenniger et al. | |
| 4,045,948 A | 9/1977 | Hannibal | |
| 4,071,207 A * | 1/1978 | Piasecki et al. | 244/23 D |
| 4,092,716 A | 5/1978 | Berg et al. | |
| 4,124,180 A | 11/1978 | Wolowicz | |
| 4,155,221 A | 5/1979 | Dhoore et al. | |
| 4,175,385 A | 11/1979 | Nash | |
| 4,214,703 A | 7/1980 | Sorensen et al. | |
| 4,241,876 A * | 12/1980 | Pedersen | 239/265.27 |
| 4,250,658 A | 2/1981 | Kress | |
| 4,358,074 A | 11/1982 | Schoen et al. | |
| 4,415,132 A | 11/1983 | Shirk | |
| 4,474,534 A | 10/1984 | Thode | |
| 4,519,559 A | 5/1985 | Logan et al. | |
| 4,568,043 A | 2/1986 | Schmittle | |
| 4,575,006 A * | 3/1986 | Madden | 239/265.29 |
| 4,596,368 A | 6/1986 | Schmittle | |
| 4,634,081 A | 1/1987 | Chee | |
| 4,709,879 A * | 12/1987 | Stafford | 244/12.1 |
| 4,804,155 A | 2/1989 | Strumbos | |
| 4,821,980 A | 4/1989 | Clausen et al. | |
| 4,875,655 A | 10/1989 | Bender et al. | |
| 4,948,072 A * | 8/1990 | Garland et al. | 244/23 D |
| 4,964,599 A | 10/1990 | Farineau | |
| 4,967,984 A | 11/1990 | Allen | |
| 4,978,071 A * | 12/1990 | MacLean et al. | 239/265.19 |
| 5,000,404 A | 3/1991 | Martorella | |
| 5,028,001 A | 7/1991 | Bender et al. | |
| 5,086,993 A | 2/1992 | Wainfan | |
| 5,115,996 A * | 5/1992 | Moller | 244/12.5 |
| 5,116,030 A | 5/1992 | Nowak et al. | |
| 5,176,339 A | 1/1993 | Schmidt | |
| 5,280,863 A | 1/1994 | Schmittle | |
| 5,282,358 A | 2/1994 | Schilling | |
| 5,289,994 A | 3/1994 | Del Campo Aguilera | |
| 5,295,643 A | 3/1994 | Ebbert et al. | |
| 5,340,057 A | 8/1994 | Schmittle | |
| 5,366,180 A | 11/1994 | Wainfan et al. | |
| 5,390,877 A | 2/1995 | Nightingale | |
| 5,395,073 A | 3/1995 | Rutan et al. | |
| 5,509,623 A | 4/1996 | Schmittle | |
| 5,516,060 A | 5/1996 | McDonnell | |
| 5,560,568 A | 10/1996 | Schmittle | |
| 5,666,803 A | 9/1997 | Windisch | |
| 5,687,948 A | 11/1997 | Whiteford et al. | |
| 5,746,390 A * | 5/1998 | Chiappetta | 244/12.3 |
| 5,765,777 A | 6/1998 | Schmittle | |
| 5,765,783 A | 6/1998 | Albion | |
| 5,769,359 A | 6/1998 | Rutan et al. | |
| 5,842,687 A | 12/1998 | David | |
| 5,941,478 A | 8/1999 | Schmittle | |
| RE036,487 E | 1/2000 | Wainfan | |
| 6,168,117 B1 | 1/2001 | Shinagawa | |
| 6,170,778 B1 | 1/2001 | Cycon et al. | |
| 6,318,668 B1 * | 11/2001 | Ulanoski et al. | 244/12.5 |
| 6,343,768 B1 | 2/2002 | Muldoon | |
| 6,364,603 B1 | 2/2002 | Czachor et al. | |
| 6,358,014 B1 | 3/2002 | Chou et al. | |
| 6,382,556 B1 | 5/2002 | Pham | |
| 6,382,559 B1 * | 5/2002 | Sutterfield et al. | 244/23 A |
| 6,471,198 B2 | 10/2002 | Herbst | |
| 6,474,603 B1 | 11/2002 | Kinkead et al. | |
| 6,539,290 B1 | 3/2003 | Vos | |
| 6,543,718 B2 * | 4/2003 | Provost | 244/12.4 |
| 6,547,180 B1 * | 4/2003 | Cassidy | 244/12.5 |
| 6,561,455 B2 | 5/2003 | Capanna | |
| 6,568,635 B2 * | 5/2003 | Carpenter | 244/82 |
| 6,592,071 B2 | 7/2003 | Kinkead et al. | |
| 6,751,946 B2 | 6/2004 | Li | |
| 6,783,096 B2 * | 8/2004 | Baldwin | 244/12.4 |
| 6,808,140 B2 * | 10/2004 | Moller | 244/12.5 |
| 2003/0127569 A1 | 7/2003 | Bacon et al. | |
| 2003/0141418 A1 | 7/2003 | Darbyshire | |
| 2004/0026563 A1 | 2/2004 | Moller | |

OTHER PUBLICATIONS

GoldenEye-50 Transition Images Aurora Flight Sciences http://www.aurora.aero/GE50/images/GE_transition.jpg.*

"GoldenEye's First Flight Successful" Aurora Flight Sciences Press Release, Jul. 16, 2003, with linked images http://www.aurora.aero/news/APR-148.html.*

"2$^{nd}$ AIAA 'Unmanned Unlimited Systems, Technologies, and Operations'" event agenda AIAA, 2003.*

Co-pending Application No.: UNASSIGNED, Inventor: Robert Parks, entitled "System and Method for Controlling a Roll Rate of a Torsionally-Disconnected Freewing aircraft" filed Sep. 19, 2005.

Carl G. Schaefer, Jr.; "GoldenEye: The Clandestine UAV"; Aurora Flight Sciences Corp; Sep. 16, 2003; 11 pages.

"GoldenEye-50 System Information Sheet"; Jul. 2003; 2 pages.

Greg Slabodkin;"Aurora Announces Plans for GoldenEye-50 Unmanned Aerial Vehicle"; Aurora Flight Sciences Press Release; APR-150; Dec. 4, 2003.

Greg Slabodkin;"GoldenEye-100 UAV Successfully Completes Initial Flight Test Program"; Aurora Flight Sciences Corp.; APR-153; Apr. 7, 2004.

Chuck Wilkins; "Team GoldenEye to Develop Organic Air Vehicle for DARPA: Aurora Flight Sciences Selected for Phase One of OAV-II Procurement"; Aurora Flight Sciences Corp.; APR-158; Dec. 7, 2004.

Chuck Wilkins; "GoldenEye-50 UAV Makes First Autonomous Transition Flights"; Aurora Flight Sciences Corp.; APR-162; Apr. 26, 2005.

Chuck Wilkins; "Team GoldenEye Selected for Phase II of DARPA OAV-II Program"; Aurora Flight Sciences Corp.; APR-165; Jul. 13, 2005.

Chuck Wilkins; "GoldenEye-50 Performs First High-Speed, Coordinated Banked Turns: High-Speed Maneuver Demonstrates System's Real-World Capabilities"; Aurora Flight Sciences Corp.; APR-167; Oct. 18, 2005.

Chuck Wilkins; "Aurora's Golden Eye Surpasses Darpa Acoustic Requirements: Tests Validate Company's Quiet Ducted Fan Technology"; Aurora Flight Scoences Corp., APR-170; Dec. 13, 2005.

Chuck Wilkins; "GoldenEye-50 Passes 100 Flight Milestone: Former Technology Development Platform's Focus Shifts to Fielding"; Aurora Flight Sciences Corp.; APR-172; Mar. 20, 2006.

Chuck Wilkins; "Team GoldenEye Wins Phase III of DARPA OAV-II Program"; Aurora Flight Sciences Corp., APR-175; Jun. 13, 2006.

Chuck Wilkins; "Aurora's GoldenEye 80 Makes Successful First Flight"; Aurora Flight Sciences Corp.; APR-178; Nov. 6, 2006.

"Near-Term Demonstrations of GoldenEye-50 UAV with Options for Advanced Features"; Aurora Flight Sciences Corp.; Jun. 30, 2005.

"GoldenEye-50: A Proposal to Lockheed Martin; Aurora Proposal No. AP04-026"; Aurora Flight Sciences Corp; Jun. 4, 2004.

"Feb. 12, 2004 Demonstration Summary: Reference to Proposal No. AP04-018"; Aurora Flight Sciences Corp.; Feb. 23, 2004.

"DARPA Heterogeneous Urban RSTA Team (HURT) Program: Aurora Proposal No. AP04-014"; Aurora Flight Sciences Corp.; Feb. 6, 2004.

"An Advanced Low-Observable UAV System For Remote Sensor Deployment: Aurora Proposal No. AP04-001"; Aurora Flight Sciences Corp.; Jan. 15, 2004.

"2nd AIAA Unmanned Unlimited Systems, Technologies, and Operations—Aerospace, Land, and Sea Conference and Workshop & Exhibit: Event Agenda"; AIAA—American Institute of Aeronautics and Astronautics; Sep. 16, 2003; 6 pages; http://www.aiaa.org/agenda.cfm?lumeetingid=834&viewcon=agenda&pageview=2&programSeeview=1&dateget=16-Sep-03.html.

http://en.wikipedia.org/wiki/Attitude_indicator; available on the web Jul. 30, 2004; 1 page.

http://www.tpub.com/content/aviation/14030/css/14030_205.html; available on the web Sep. 26, 2003; 1 page.

http://www.grc.nasa.gov/WWW/K-12/airplane/pitot.html; available on the web May 22, 2000; 3 pages.

Notification of Transmittal of the International Search Report and the Written Opinion, the International Search Report, and the Written Opinion for International Application No. PCT/US05/33233; mailed Dec. 14, 2006; 12 pages.

"Freewing Scorpion UAV", http://www.scaled.com/projects/freewing.html; Nov. 16, 2006; 2 pages.

http://en.wikipedia.org/wiki/Inertial_measurement_unit; available on the web Nov. 27, 2002; 2 pages.

"GoldenEye's First Flight Successful." Aurora Flight Sciences Press Release, Jul. 16, 2003, with linked images. http://www.aurora.aero/news/APR-148.html; 9 pages.

GoldenEye-50 Transition Images. Apr. 26, 2005; further depicts GoldenEye-50 as disclosed in Garamone; http://www.aurora.aero/GE50/images/GE-transition.jpg;; 2 pages.

Notification of Transmittal of the International Search Report and the Written Opinion, the International Search Report, and the Written Opinion for the International Application No. PCT/US05/33000; mailed Jun. 28, 2007; 15 pages.

"International Preliminary Report on Patentability"; PCT/US2005/033000; Jul. 26, 2007; 12 Pages.

Athena Controls; GuideStar 111m; http://www.athenati.com/products_services/services/guidestar_gs-111m, 2 pages.

Athena Controls; GuideStar Flies on GoldenEye-50, Apr. 26, 2005; 1 page; http://www.athenati.com/news/press_releases/april_26_2005.

"International Preliminary Report on Patentability"; PCT/US2005/033231; Sep. 20, 2007; 2 pages.

* cited by examiner

NEUTRAL RUDDER

LEFT RUDDER

RIGHT RUDDER

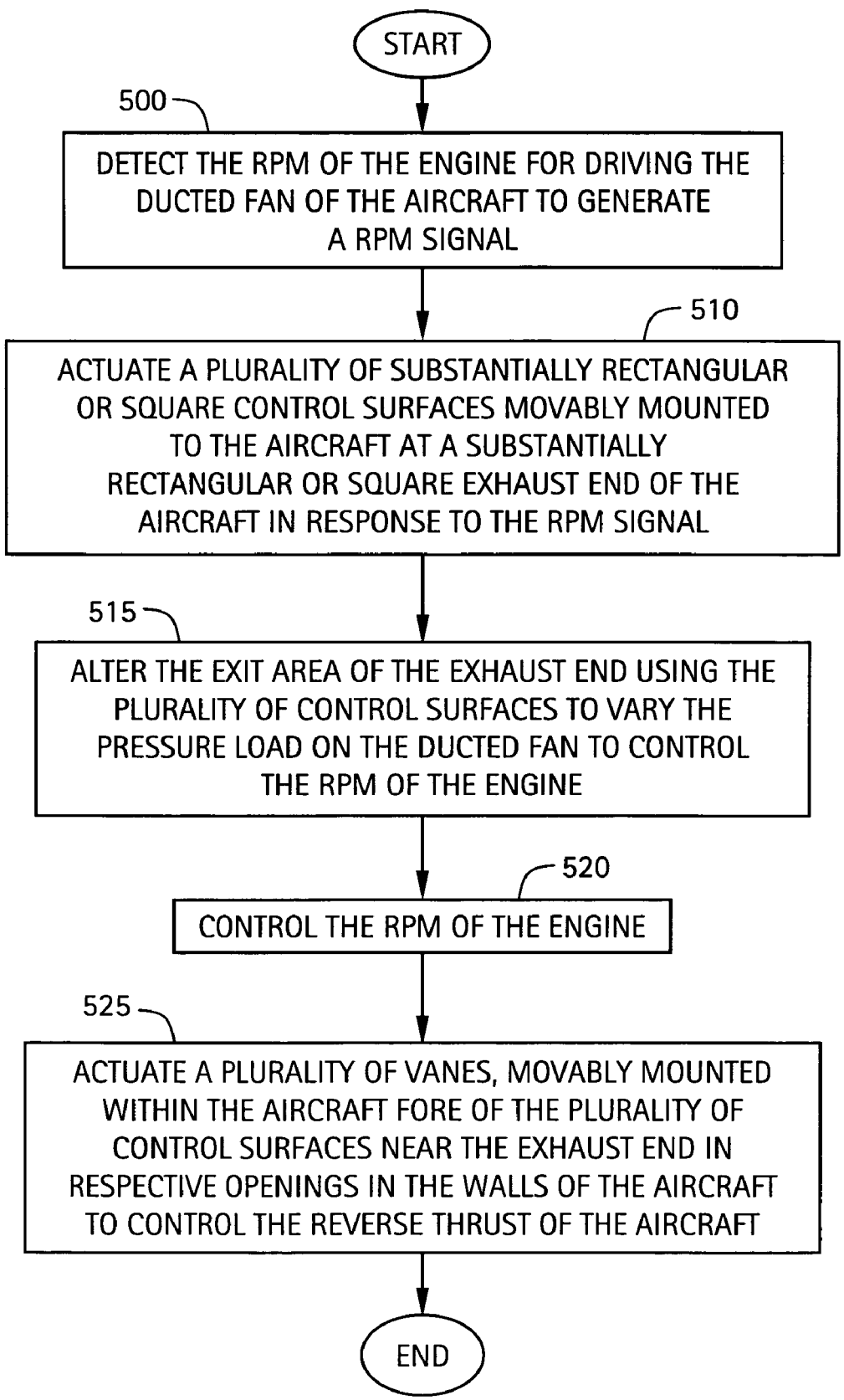

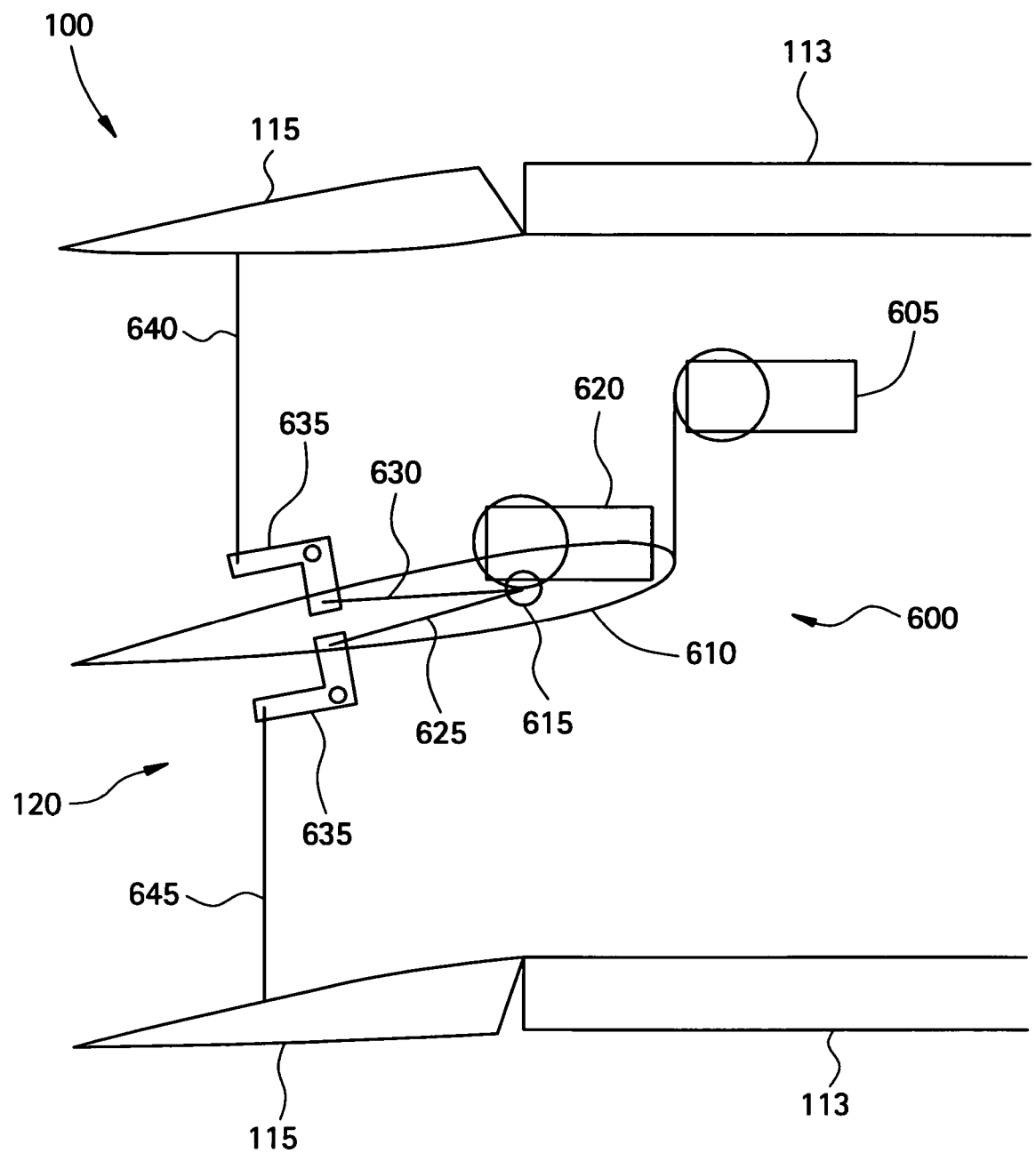

SYSTEM AND METHOD FOR CONTROLLING ENGINE RPM OF A DUCTED FAN AIRCRAFT

This application claims priority under 35 U.S.C. § 119(e) to U.S. Provisional Application No. 60/610,565, filed on Sep. 17, 2004, the entire contents of which are hereby incorporated by reference herein.

BACKGROUND

1. Field of the Invention

The present invention relates to ducted fan aircraft. More particularly, the present invention relates to a system and method for controlling engine RPM of a ducted fan aircraft, such as, for example, a ducted fan vertical takeoff and landing (VTOL) aircraft.

2. Background Information

There have been numerous designs for vertical take off and landing (VTOL) aircraft that are powered by a single ducted fan. In such designs, the pitch, yaw and roll control moments are generated by vanes located aft of the fan, within the high-speed air flow. These vanes turn the exhaust flow about an appropriate axis to produce the required moments. In conventional designs, the vanes are grouped into two sets, each with their pivot axes perpendicular to each other and also perpendicular to the duct axis. The vanes are located either within the duct or just behind (e.g., aft of) the duct. Conventionally, one set of vanes produces pitch moments, and the other set produces yaw moments. Differential deflection of some or all of the vanes produces roll moments.

However, such designs suffer from numerous problems. For example, the vanes can only redirect a fraction of the total air flow for pitch or yaw control, thus limiting the maximum moments that can be produced. In addition, the vanes are in the high-speed air flow, which results in high drag and also block some of the nozzle area.

SUMMARY OF THE INVENTION

A system and method for controlling engine RPM of a ducted fan aircraft, such as a ducted fan vertical takeoff and landing (VTOL) aircraft, are disclosed. In accordance with exemplary embodiments of the present invention, according to a first aspect of the present invention, an aircraft including a ducted fan and an engine for driving the ducted fan includes a plurality of vanes movably mounted to the ducted fan at a substantially rectangular exhaust end of the ducted fan. Each of the plurality of vanes is substantially rectangular. The plurality of vanes are configured to alter an exit area of the exhaust end. The aircraft includes a sensor circuit for detecting a RPM of the engine and for outputting a RPM signal. The aircraft includes a control circuit coupled to the sensor circuit and the plurality of vanes. The control circuit is configured to actuate the plurality of vanes to alter the exit area of the exhaust end to vary a pressure load on the ducted fan to control the RPM of the engine in response to the RPM signal.

According to the first aspect, the control circuit can be configured to control the RPM of the engine to maintain a maximum power of the engine for full-throttle flight. The control circuit can be configured to control the RPM of the engine to maintain the RPM within a substantially narrow range of values. The control circuit can be configured to control the RPM of the engine to operate the ducted fan at a substantially optimal forward-speed-to-tip-speed ratio of the ducted fan. The aircraft can include a plurality of control surfaces movably mounted on an interior of the ducted fan. The aircraft can include a plurality of control surfaces movably mounted on an exterior of the ducted fan. The aircraft can include a plurality of control surfaces movably mounted on outer corner edges of the exhaust end. The aircraft can include a plurality of sets of control surfaces movably mounted on outer corner edges of the exhaust end. The plurality of sets of control surfaces can be staggered along the outer corner edges of the exhaust end. At least one set of control surfaces can be configured for differential deflection. The at least one set of control surfaces can include a split at substantially a middle of a span of the at least one set of control surfaces. A first set of control surfaces can be mounted fore of a second set of control surfaces. A trailing edge of the first set of control surfaces can be substantially aligned with a hinge edge of the second set of control surfaces. A hinge edge of a first set of control surfaces on an outer corner edge of the exhaust end can be substantially aligned with a hinge edge of a second set of control surfaces on an adjacent outer corner edge of the exhaust end. The first and second sets of control surfaces can be configured to allow unobstructed deflection between the first and second sets of control surfaces.

According to the first aspect, the aircraft can include a plurality of sets of control surfaces. At least a first set of control surfaces can be movably mounted on outer corner edges of the exhaust end. At least a second set of control surfaces can be movably mounted within the ducted fan fore of the plurality of vanes near the exhaust end. The aircraft can include at least two additional control surfaces movably mounted within the ducted fan fore of the plurality of vanes near the exhaust end and substantially flush with respective interior walls of the ducted fan. The at least two additional control surfaces can be coupled to the at least second set of control surfaces such that a trailing edge of one of the at least two additional control surfaces moves into an interior of the ducted fan when trailing edges of the at least second set of control surfaces are deflected away from the respective interior wall of the ducted fan. The aircraft can include a plurality of control surfaces movably mounted within the ducted fan fore of the plurality of vanes near the exhaust end in respective openings in walls of the ducted fan. The plurality of control surfaces can seal the openings when closed. The plurality of control surfaces can divert air flow from inside the ducted fan to outside the ducted fan through the openings when open. The control circuit can be configured to actuate the plurality of control surfaces to control a reverse thrust of the aircraft. The aircraft can include a first servo mechanism for balancing pressure loads on the plurality of vanes, a second servo mechanism for actuating the plurality of vanes, and a linkage for coupling the first and second servo mechanisms to the plurality of vanes. The first servo mechanism can comprise a high force, low speed servo, and the second servo mechanism can comprise a low force, high speed servo. A duct of the ducted fan can include a substantially circular portion at a location of a fan of the ducted fan. According to an exemplary embodiment of the first aspect, the aircraft can comprise, for example, a VTOL ducted fan aircraft.

According to a second aspect of the present invention, a system for controlling a RPM of an engine for driving a ducted fan of an aircraft includes a plurality of substantially rectangular control surfaces movably mounted to the ducted fan at a substantially rectangular exhaust end of the ducted fan. The plurality of control surfaces are configured to alter an exit area of the exhaust end. The system includes a sensor for sensing the RPM of the engine and for outputting a RPM indication signal. The system includes an actuator coupled to the sensor and the plurality of control surfaces.. The actuator is configured to actuate the plurality of control surfaces to alter the exit area of the exhaust end to vary a pressure load on the ducted fan to control the RPM of the engine in response to the RPM indication signal.

According to the second aspect, the actuator can be configured to control the RPM of the engine to maintain a maximum power of the engine for full-throttle flight. The actuator can be configured to control the RPM of the engine to maintain the RPM within a substantially narrow range of values. The actuator is configured to control the RPM of the engine to operate the ducted fan at a substantially optimal forward-speed-to-tip-speed ratio of the ducted fan. The system can include a plurality of vanes movably mounted on an interior of the ducted fan. The system can include a plurality of vanes movably mounted on an exterior of the ducted fan. The system can include a plurality of vanes movably mounted on outer corner edges of the exhaust end. The system can include a plurality of sets of vanes movably mounted on outer corner edges of the exhaust end. The plurality of sets of vanes can be staggered along the outer corner edges of the exhaust end. At least one set of vanes can be configured for differential deflection. The at least one set of vanes can include a split at substantially a middle of a span of the at least one set of vanes. A first set of vanes can be mounted fore of a second set of vanes. A trailing edge of the first set of vanes can be substantially aligned with a hinge edge of the second set of vanes. A hinge edge of a first set of vanes on an outer corner edge of the exhaust end can be substantially aligned with a hinge edge of a second set of vanes on an adjacent outer corner edge of the exhaust end. The first and second sets of vanes are configured to allow unobstructed deflection between the first and second sets of vanes.

According to the second aspect, the system can include a plurality of sets of vanes. At least a first set of vanes can be movably mounted on outer corner edges of the exhaust end. At least a second set of vanes can be movably mounted within the ducted fan fore of the plurality of control surfaces near the exhaust end. The system can include at least two additional vanes movably mounted within the ducted fan fore of the plurality of control surfaces near the exhaust end and substantially flush with respective interior walls of the ducted fan. The at least two additional vanes can be coupled to the at least second set of vanes such that a trailing edge of one of the at least two additional vanes moves into an interior of the ducted fan when trailing edges of the at least second set of vanes are deflected away from the respective interior wall of the ducted fan. The system can include a plurality of vanes movably mounted within the ducted fan fore of the plurality of control surfaces near the exhaust end in respective openings in walls of the ducted fan. The plurality of vanes can seal the openings when closed. The plurality of vanes can divert air flow from inside the ducted fan to outside the ducted fan through the openings when open. The actuator is configured to actuate the plurality of vanes to control a reverse thrust of the aircraft. The system can include a first servo for balancing pressure loads on the plurality of control surfaces, a second servo for actuating the plurality of control surfaces, and a linkage for coupling the first and second servos to the plurality of control surfaces. The first servo can comprise a high force, low speed servo, and the second servo can comprise a low force, high speed servo. A duct of the ducted fan can include a substantially circular portion at a location of a fan of the ducted fan.

According to an exemplary embodiment of the second aspect, the aircraft can comprise, for example, a VTOL ducted fan aircraft.

According to a third aspect of the present invention, an aircraft including a ducted fan and an engine for driving the ducted fan includes a plurality of vane means movably mounted to the ducted fan at a substantially rectangular exhaust end of the ducted fan. Each of the plurality of vane means is substantially rectangular. The plurality of vane means are configured to alter an exit area of the exhaust end. The aircraft includes a sensor means for detecting a RPM of the engine and for outputting a RPM signal. The aircraft includes a control means coupled to the sensor means and the plurality of vane means for actuating the plurality of vane means to alter the exit area of the exhaust end to vary a pressure load on the ducted fan to control the RPM of the engine in response to the RPM signal.

According to the third aspect, the control means can be configured to control the RPM of the engine to maintain a maximum power of the engine for full-throttle flight. The control means can be configured to control the RPM of the engine to maintain the RPM within a substantially narrow range of values. The control means can be configured to control the RPM of the engine to operate the ducted fan at a substantially optimal forward-speed-to-tip-speed ratio of the ducted fan. The aircraft can include a plurality of control surface means movably mounted on an interior of the ducted fan. The aircraft can include a plurality of control surface means movably mounted on an exterior of the ducted fan. The aircraft can include a plurality of control surface means movably mounted on outer corner edges of the exhaust end. The aircraft can include a plurality of sets of control surface means movably mounted on outer corner edges of the exhaust end. The plurality of sets of control surface means can be staggered along the outer corner edges of the exhaust end. At least one set of control surface means can be configured for differential deflection. The at least one set of control surface means can include a split at substantially a middle of a span of the at least one set of control surface means. A first set of control surface means can be mounted fore of a second set of control surface means. A trailing edge of the first set of control surface means can be substantially aligned with a hinge edge of the second set of control surface means. A hinge edge of a first set of control surface means on an outer corner edge of the exhaust end can be substantially aligned with a hinge edge of a second set of control surface means on an adjacent outer corner edge of the exhaust end. The first and second sets of control surface means can be configured to allow unobstructed deflection between the first and second sets of control surface means.

According to the third aspect, the aircraft can include a plurality of sets of control surface means. At least a first set of control surface means can be movably mounted on outer corner edges of the exhaust end. At least a second set of control surface means can be movably mounted within the ducted fan fore of the plurality of vane means near the exhaust end. The aircraft can include at least two additional control surface means movably mounted within the ducted fan fore of the plurality of vane means near the exhaust end and substantially flush with respective interior walls of the ducted fan. The at least two additional control surface means can be coupled to the at least second set of control surface means such that a trailing edge of one of the at least two additional control surface means moves into an interior of the ducted fan when trailing edges of the at least second set of control surface means are deflected away from the respective interior wall of the ducted fan. The aircraft can include a plurality of control surface means movably mounted within the ducted fan fore of the plurality of vane means near the exhaust end in respective openings in walls of the ducted fan. The plurality of control surface means can seal the openings when closed. The plurality of control surface means can divert air flow from inside the ducted fan to outside the ducted fan through the openings when open. The control means can be configured to actuate the plurality of control surface means to control a reverse thrust of the aircraft. The aircraft can include a first servo means for balancing pressure loads on the plurality of vane means, a second servo means for actuating the plurality of vane means, and a linkage means for coupling the first and second servo means to the plurality of vanes. The first servo means can comprise a high force, low speed servo means, and the second servo means can comprise a low force, high speed servo means. A duct means of the ducted fan can include a substantially circular portion at a location of a means for rotating of the ducted fan. According to an exemplary embodiment of the third aspect, the aircraft can comprise, for example, a VTOL ducted fan aircraft.

According to a fourth aspect of the present invention, a system for controlling a RPM of an engine for driving a ducted fan of an aircraft includes a plurality of substantially rectangular control surface means movably mounted to the ducted fan at a substantially rectangular exhaust end of the ducted fan. The plurality of control surface means are configured to alter an exit area of the exhaust end. The system includes a sensor means for sensing the RPM of the engine and for outputting a RPM indication signal. The system includes an actuator means coupled to the sensor means and the plurality of control surface means for actuating the plurality of control surface means to alter the exit area of the exhaust end to vary a pressure load on the ducted fan to control the RPM of the engine in response to the RPM indication signal.

According to the fourth aspect, the actuator means can be configured to control the RPM of the engine to maintain a maximum power of the engine for full-throttle flight. The actuator means can be configured to control the RPM of the engine to maintain the RPM within a substantially narrow range of values. The actuator means can be configured to control the RPM of the engine to operate the ducted fan at a substantially optimal forward-speed-to-tip-speed ratio of the ducted fan. The system can include a plurality of vane means movably mounted on an interior of the ducted fan. The system can include a plurality of vane means movably mounted on an exterior of the ducted fan. The system can include a plurality of vane means movably mounted on outer corner edges of the exhaust end. The system can include a plurality of sets of vane means movably mounted on outer corner edges of the exhaust end. The plurality of sets of vane means can be staggered along the outer corner edges of the exhaust end. At least one set of vane means can be configured for differential deflection. The at least one set of vane means can include a split at substantially a middle of a span of the at least one set of vane means. A first set of vane means can be mounted fore of a second set of vane means. A trailing edge of the first set of vane means can be substantially aligned with a hinge edge of the second set of vane means. A hinge edge of a first set of vane means on an outer corner edge of the exhaust end can be substantially aligned with a hinge edge of a second set of vane means on an adjacent outer corner edge of the exhaust end. The first and second sets of vane means can be configured to allow unobstructed deflection between the first and second sets of vane means.

According to the fourth aspect, the system can include a plurality of sets of vane means. At least a first set of vane means can be movably mounted on outer corner edges of the exhaust end. At least a second set of vane means can be movably mounted within the ducted fan fore of the plurality of control surface means near the exhaust end. The system can include at least two additional vane means movably mounted within the ducted fan fore of the plurality of control surface means near the exhaust end and substantially flush with respective interior walls of the ducted fan. The at least two additional vane means can be coupled to the at least second set of vane means such that a trailing edge of one of the at least two additional vane means moves into an interior of the ducted fan when trailing edges of the at least second set of vane means are deflected away from the respective interior wall of the ducted fan. The system can include a plurality of vane means movably mounted within the ducted fan fore of the plurality of control surface means near the exhaust end in respective openings in walls of the ducted fan. The plurality of vane means can seal the openings when closed. The plurality of vane means can divert air flow from inside the ducted fan means to outside the ducted fan through the openings when open. The actuator means can be configured to actuate the plurality of vane means to control a reverse thrust of the aircraft. The system can include a first servo means for balancing pressure loads on the plurality of control surface means, a second servo means for actuating the plurality of control surface means, and a linkage means for coupling the first and second servo means to the plurality of control surface means. The first servo means can comprise a high force, low speed servo means, and the second servo means can comprise a low force, high speed servo. A duct means of the ducted fan can include a substantially circular portion at a location of a means for rotating of the ducted fan. According to an exemplary embodiment of the fourth aspect, the aircraft can comprise, for example, a VTOL ducted fan aircraft.

According to a fifth aspect of the present invention, a method of controlling a RPM of an engine for driving a ducted fan of an aircraft includes the steps of: a.) detecting the RPM of the engine to generate a RPM signal; b.) actuating a plurality of substantially rectangular control surfaces movably mounted to the ducted fan at a substantially rectangular exhaust end of the ducted fan in response to the RPM signal; and c.) altering an exit area of the exhaust end using the plurality of control surfaces to vary a pressure load on the ducted fan to control the RPM of the engine.

According to the fifth aspect, the method can include the steps of: d.) controlling the RPM of the engine to maintain a maximum power of the engine for full-throttle flight; e.) controlling the RPM of the engine to maintain the RPM within a substantially narrow range of values; f.) controlling the RPM of the engine to operate the ducted fan at a substantially optimal forward-speed-to-tip-speed ratio of the ducted fan; g.) movably mounting a plurality of vanes on an interior of the ducted fan; h.) movably mounting a plurality of vanes on an exterior of the ducted fan; i.) movably mounting a plurality of vanes on outer corner edges of the exhaust end; j.) movably mounting a plurality of sets of vanes on outer corner edges of the exhaust end; k.) staggering the plurality of sets of vanes along the outer corner edges of the exhaust end; and l.) differentially deflecting at least one set of vanes. The at least one set of vanes can include a split at substantially a middle of a span of the at least one set of vanes. A first set of vanes can be mounted fore of a second set of vanes. A trailing edge of the first set of vanes can be substantially aligned with a hinge edge of the second set of vanes. A hinge edge of a first set of vanes on an outer corner edge of the exhaust end can be substantially aligned with a hinge edge of a second set of vanes on an adjacent outer corner edge of the exhaust end. The first and second sets of vanes can be configured to allow unobstructed deflection between the first and second sets of vanes.

According to the fifth aspect, the method can include the steps of: m.) movably mounting at least a first set of vanes on outer corner edges of the exhaust end; n.) movably mounting at least a second set of vanes within the ducted fan fore of the plurality of control surfaces near the exhaust end; o.) movably mounting at least two additional vanes within the ducted fan fore of the plurality of control surfaces near the exhaust end and substantially flush with respective interior walls of the ducted fan; p.) coupling the at least two additional vanes to the at least second set of vanes such that a trailing edge of one of the at least two additional vanes moves into an interior of the ducted fan when trailing edges of the at least second set of vanes are deflected away from the respective interior wall of the ducted fan; q.) movably mounting a plurality of vanes within the ducted fan fore of the plurality of control surfaces near the exhaust end in respective openings in walls of the ducted fan, wherein the plurality of vanes seal the openings when closed, and wherein the plurality of vanes divert air flow from inside the ducted fan to outside the ducted fan through the openings when open; and r.) actuating the plurality of vanes to control a reverse thrust of the aircraft. Step (b) can comprise the step of: s.) balancing pressure loads on the plurality of control surfaces. A duct of the ducted fan can include a substantially circular portion at a location of a fan of the ducted fan. According to an exemplary embodiment of the fifth aspect, the aircraft can comprise, for example, a VTOL ducted fan aircraft.

According to a sixth aspect of the present invention, a computer program for controlling a RPM of an engine for driving a ducted fan of an aircraft performs the steps of: a.) receiving an indication of the RPM of the engine; and b.) generating a RPM signal in response to step (a) for actuating a plurality of substantially rectangular control surfaces movably mounted to the ducted fan at a substantially rectangular exhaust end of the ducted fan to alter an exit area of the exhaust end using the plurality of control surfaces to vary a pressure load on the ducted fan to control the RPM of the engine.

According to the sixth aspect, the computer program can perform the steps of: c.) generating the RPM signal to control the RPM of the engine to maintain a maximum power of the engine for full-throttle flight; d.) generating the RPM signal to control the RPM of the engine to maintain the RPM within a substantially narrow range of values; and e.) generating the RPM signal to control the RPM of the engine to operate the ducted fan at a substantially optimal forward-speed-to-tip-speed ratio of the ducted fan. The computer program can be stored on, for example, a computer-readable medium.

According to a seventh aspect of the present invention, an aircraft including a ducted fan and an engine for driving the ducted fan includes a plurality of vanes movably mounted to the ducted fan at a substantially circular exhaust end of the ducted fan. The plurality of vanes are configured to alter an exit area of the exhaust end. The aircraft includes a sensor circuit for detecting a RPM of the engine and for outputting a RPM signal. The aircraft includes a control circuit coupled to the sensor circuit and the plurality of vanes. The control circuit is configured to actuate the plurality of vanes to alter the exit area of the exhaust end to vary a pressure load on the ducted fan to control the RPM of the engine in response to the RPM signal.

According to an eighth aspect of the present invention, a system for controlling a RPM of an engine of an aircraft, wherein the aircraft includes a ducted fan and the engine drives the ducted fan, includes a plurality of control surfaces movably mounted to the ducted fan at a substantially circular exhaust end of the ducted fan. The plurality of control surfaces are configured to alter an exit area of the exhaust end. The system includes a sensor for sensing the RPM of the engine and for outputting a RPM indication signal. The system includes a controller coupled to the sensor and the plurality of control surfaces. The controller is configured to actuate the plurality of control surfaces to alter the exit area of the exhaust end to vary a pressure load on the ducted fan to control the RPM of the engine in response to the RPM indication signal.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 5 is a flowchart illustrating steps for controlling a RPM of an engine for driving a ducted fan of an aircraft, in accordance with an exemplary embodiment of the present invention.

FIGS. 6A-6C are diagrams illustrating operation of a mechanical linkage, in accordance with an exemplary embodiment of the present invention.

DETAILED DESCRIPTION OF THE PREFERRED EMBODIMENTS

Exemplary embodiments of the present invention are directed to an aircraft that includes a ducted fan and an engine for driving the ducted fan, such as, for example, a vertical take-off and landing (VTOL) ducted fan aircraft or the like. According to exemplary embodiments, the ducted fan aircraft includes an exhaust (aft) end that can have, for example, a substantially rectangular or square cross sectional area. A plurality of vanes can be movably mounted to the ducted fan at the exhaust end. Each of the plurality of vanes can also be substantially rectangular or square in shape. Using a substantially rectangular or square exhaust nozzle and vanes, the plurality of vanes can be deflected to change the exit area of the exhaust end of the aircraft. For a ducted fan aircraft, the change in exhaust end exit area can change the air pressure load on the ducted fan. As the load on the ducted fan increases, the ducted fan can spin more slowly. As the ducted fan spins more slowly, the revolutions per minute (RPM) of the engine driving the ducted fan can decrease accordingly. Thus, the plurality of vanes can be deflected to alter the RPM of the engine of the ducted fan aircraft, for example, to keep the engine operating at or near its appropriate RPM for peak power production.

Figure 1:
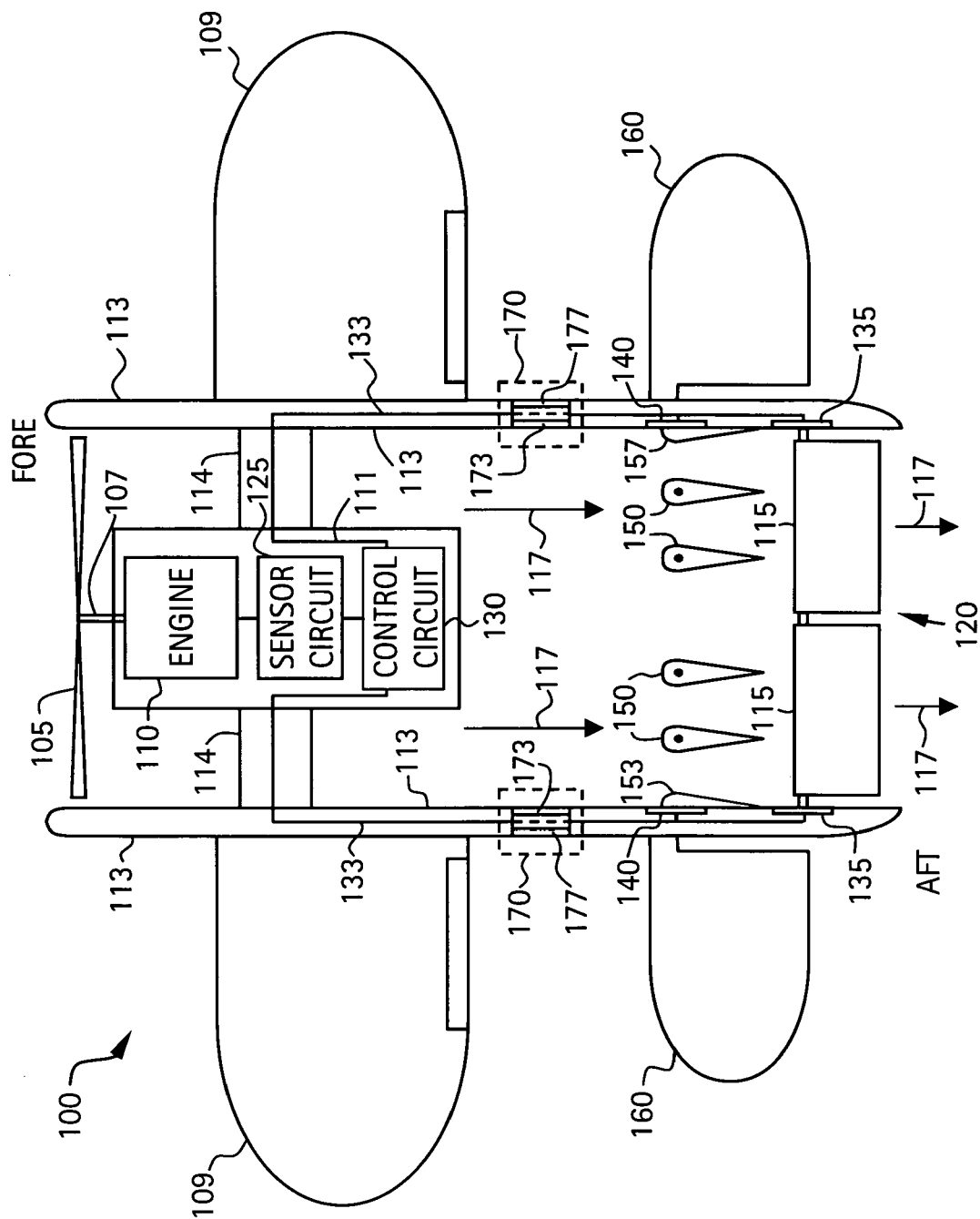
FIG. 1 is a diagram illustrating a cut-away, side view of a ducted fan aircraft, in accordance with an exemplary embodiment of the present invention.

These and other aspects of the present invention will now be described in greater detail. FIG. 1 is a diagram illustrating a cut-away, side view of a ducted fan aircraft 100, in accordance with an exemplary embodiment of the present invention. The ducted fan aircraft 100 includes a ducted rotor 105 and an engine 110 for driving the ducted rotor 105 (e.g., via any suitable ducted rotor drive shaft 107). The engine 110 can be mounted within the ducted fan aircraft 100 to the interior of the duct walls 113 that form the fuselage of the ducted fan aircraft 100 using any suitable structure capable of mounting and supporting the engine 110 within the ducted fan aircraft 100, including, for example, any suitable type of brace or mount 114 or the like. The fuselage of the ducted fan aircraft 100 can be substantially circular in circumference. For example, the circumference of the duct walls 113 can be substantially circular at the location of the ducted rotor 105 to allow for unhindered rotation of the ducted rotor 105.

The ducted fan aircraft 100 includes a plurality of nozzle vanes 115 movably mounted to the ducted fan aircraft 100 at a substantially rectangular or square exhaust (aft) end 120 of the ducted fan aircraft 100. According to an exemplary embodiment, each of the plurality of nozzle vanes 115 can be substantially rectangular or square in shape.

Figure 2:
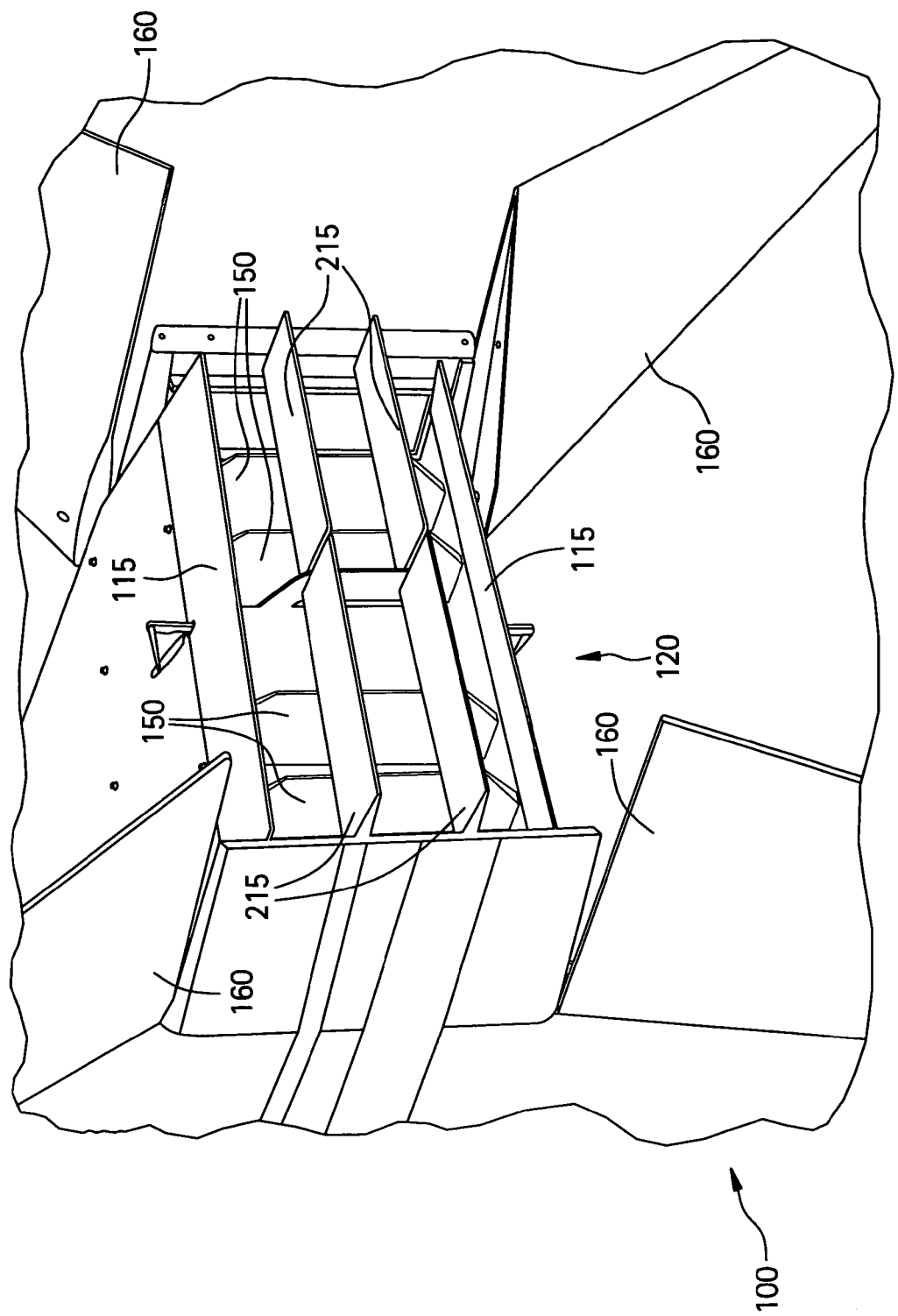
FIG. 2 is a diagram illustrating an aft view of the ducted fan aircraft, in accordance with an exemplary embodiment of the present invention.

FIG. 2 is a diagram illustrating an aft view of the ducted fan aircraft 100, in accordance with an exemplary embodiment of the present invention. For purposes of illustration and not limitation, FIG. 2 illustrates a substantially rectangular exhaust end 120 of the ducted fan aircraft 100. Additionally, FIG. 2 illustrates that each of the plurality of nozzle vanes 115 can be substantially rectangular in shape. For example, the plurality of nozzle vanes 115 can be arranged substantially parallel to the longest sides of the substantially rectangular exhaust end 120. The substantially rectangular exhaust end 120 allows for mounting of the plurality of nozzle vanes 115 along the periphery of the duct walls 113 that form the exhaust end 120 of the fuselage of the ducted fan aircraft 100, and on the substantially straight edges of those duct walls 113. Such a configuration provides for an effectively sealed hinge line. Furthermore, such a configuration allows substantially all of the air flow 117 through the interior of the ducted fan aircraft 100 to be influenced by the plurality of nozzle vanes 115. Since more of the air flow 117 can be deflected by the plurality of nozzle vanes 115, more moment can be generated for a given deflection of the plurality of nozzle vanes 115 to provide for better control of the ducted fan aircraft 100. Thus, the peak available control moment is increased. Consequently, more thrust can be available to lift the ducted fan aircraft 100.

According to an alternative exemplary embodiment, the exhaust end 120 and each of the plurality of nozzle vanes 115 can be substantially square in shape. However, the exhaust end 120 and each of the plurality of nozzle vanes 115 can be of any suitable shape. For example, the exhaust end 120 can be substantially circular in shape, with each of the plurality of nozzle vanes 115 shaped accordingly to fit and deflect within the substantially circular shape of the exhaust end 120. The ducted fan aircraft 100 can include any suitable number of control vanes 215 at the exhaust end 120. The control vanes 215 can comprise, for example, a similar shape and configuration to the plurality of nozzle vanes 115. However, the control vanes 215 can be situated, for example, between the plurality of nozzle vanes 115 (e.g., within the periphery of the duct walls 113 at the exhaust end 120). The control vanes 215 can be deflected to provide directional control of the ducted fan aircraft 100.

As illustrated in FIG. 2, the plurality of nozzle vanes 115 are situated along the periphery of the exhaust end 120 of the ducted fan aircraft 100. The plurality of nozzle vanes 115 can be deflected (whether individually or in unison) to any position from closed to open. In the closed position, the plurality of nozzle vanes 115 are oriented substantially perpendicular to the air flow 117 to reduce the area of the exhaust end 120. In the open position, the plurality of nozzle vanes 115 are oriented substantially parallel to the air flow 117 exiting the exhaust end 120. As the position or orientation of the plurality of nozzle vanes 115 is changed from opened to closed, the amount of area through which the exhaust gases can exit the exhaust end 120 decreases. Thus, the plurality of nozzle vanes 115 are configured to alter an exit area of the exhaust end 120.

As illustrated in FIG. 1, the ducted fan aircraft 100 includes a sensor circuit 125 that is configured to detect the RPM of the engine 110 and configured to output a RPM signal. The sensor circuit 125 can comprise any suitable form of electrical, electronic (e.g., hardware, software, firmware or any suitable combination thereof), mechanical or mechanical/electrical tachometer or the like that is capable of measuring or otherwise detecting the RPM of the engine 110 (e.g., continuously or at predetermined intervals). According to exemplary embodiments, the sensor circuit 125 is configured to output a RPM signal or other indication of the RPM of the engine 110 (e.g., continuously or at predetermined intervals). The RPM signal can comprise, for example, a voltage signal in which the amplitude of the voltage signal corresponds to the RPM of the engine 110. Alternatively, the RPM signal can comprise a series of code or codeword sequences, in which each code or codeword sequence corresponds to an RPM of the engine 110. For example, for a three-bit codeword, the bits 000 can represent zero RPM, bits 111 can represent maximum RPM for the engine 110, and the remaining bit sequences between 000 and 111 can represent, for example, percentages of the maximum RPM. Those of ordinary skill in the art will recognize that other methods of representing the RPM signal can be used.

The ducted fan aircraft 100 includes a control circuit 130 that is in electrical communication with the sensor circuit 125 and coupled to the plurality of nozzle vanes 115. According to exemplary embodiments, the control circuit 130 is configured to actuate the plurality of nozzle vanes 115 to alter the exit area of the exhaust end 120 to vary the pressure load on the ducted rotor 105 to control the RPM of the engine 110 in response to the RPM signal. In other words, as the plurality of nozzle vanes 115 are deflected from an open position to a closed position, the area through which the air flow 117 can escape through the exhaust end 120 will decrease. Such a reduction of the exit area of the exhaust end 120 causes an increase in the air pressure within the ducted fan aircraft 100. The increase in the air pressure within the ducted fan aircraft 100 causes a corresponding increase in the air pressure load on the ducted rotor 105. For any given engine throttle, as the load on the ducted rotor 105 is increased, the ducted rotor 105 will spin more slowly, as the ducted rotor 105 must work harder in the presence of the increased air pressure load. The slowing in the revolutions of the ducted rotor 105 thereby causes a reduction in the RPM of the engine 110 that is driving the ducted rotor 105. Thus, according to exemplary embodiments, by altering the deflection of the plurality of nozzle vanes 115, the control circuit 130 can control the RPM of the engine 110.

Consequently, exemplary embodiments of the present invention can be used to keep the engine 110 operating at or near its optimum RPM for peak power production. In other words, the control circuit 130 can be configured to control the RPM of the engine 110 to maintain maximum power of the engine 110 for full-throttle flight. Various control algorithms can be used to maintain such full-throttle performance. For example, a suitable control algorithm for full-throttle flight can adjust the deflection of the plurality of nozzle vanes 115 such that the engine 110 maintains the RPM for maximum power (e.g., by retrieving values from a look-up table or the like stored in control circuit 130 that correspond to the amount of deflection to achieve the RPM for maximum power). Such a control algorithm will depend on numerous factors, including the size and type of engine used, the maximum power of the engine, and other like factors.

For example, given a specific engine 110, the RPM for maximum power for that engine 110 will be a known value (e.g., through engine specifications or testing). The control circuit 130 can maintain such a RPM value (e.g., programmed, stored (e.g., in a look-up table or the like) or hard-wired into the control circuit 130). By comparing the RPM signal from the sensor circuit 125 and the predetermined RPM value, the control circuit 130 can alter the deflection of the plurality of nozzle vanes 115 to increase or decrease the load on the ducted rotor 105 to maintain the RPM of the engine 110 at the known RPM value. By maintaining the RPM of the engine 110 for maximum power, the ducted rotor 105 can also operate at or near its optimal design point (e.g., forward-speed-to-tip-speed ratio) over a wide range of flight speeds. Additionally, if the RPM of engine 110 is maintained within a substantially narrow ranges of RPM values during operation, the design of any accompanying engine mufflers can be simplified, because the mufflers can be specifically tuned to work in a narrow band of frequencies.

According to exemplary embodiments, the control circuit 130 is in electrical communication with servo mechanisms 135 (e.g., via wired or wireless communication, such as communication links 133) that are coupled to the plurality of nozzle vanes 115. The servo mechanisms 135 are configured to move or otherwise deflect the plurality of nozzle vanes 115 in response to control signals from the control circuit 130. Any suitable type of servo mechanism 135 can be used that is capable of moving or otherwise deflecting the plurality of nozzle vanes 115.

However, it is noted that the nozzle vanes 115 that are used to alter the exit area of the exhaust end 120 and the control vanes 215 can move together, in the same rotational sense, for directional control of the ducted fan aircraft 100. For such control, the control vanes 215 can make small motions very quickly. The plurality of nozzle vanes 115, if also used for control purposes, can also move quickly. A low force, high speed servo mechanism 135 can be used to achieve such control. As discussed previously, the nozzle vanes 115 are also rotated to vary the exit area of the exhaust end 120. Consequently, there can be very large pressure loads on the nozzle vanes 115 when the nozzle vanes 115 have been deflected such that the exit area of the exhaust end 120 is at a minimum. A high force, low speed servo mechanism 135 can be used to achieve such control.

Figure 6A:
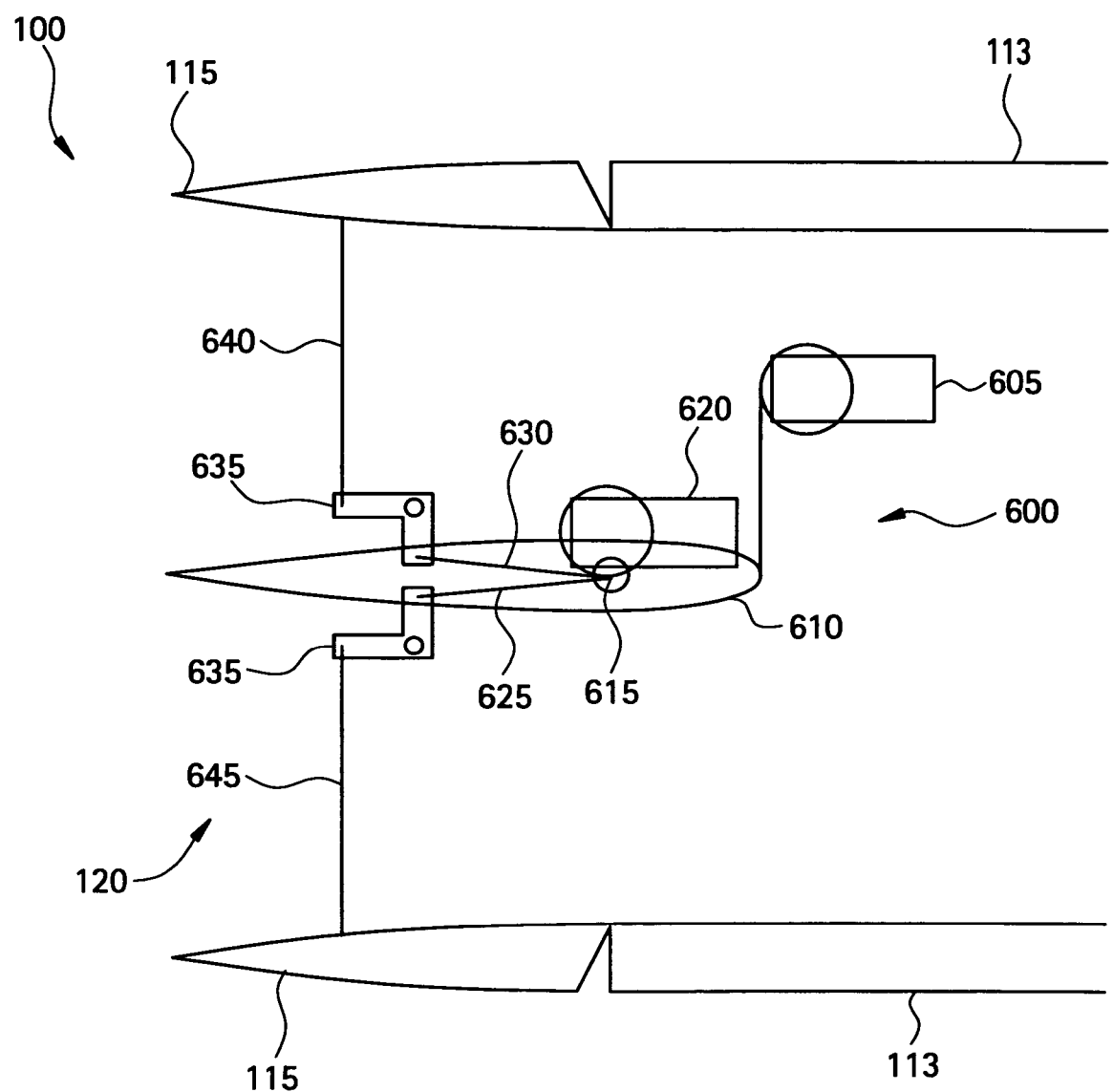
Figure 6C:
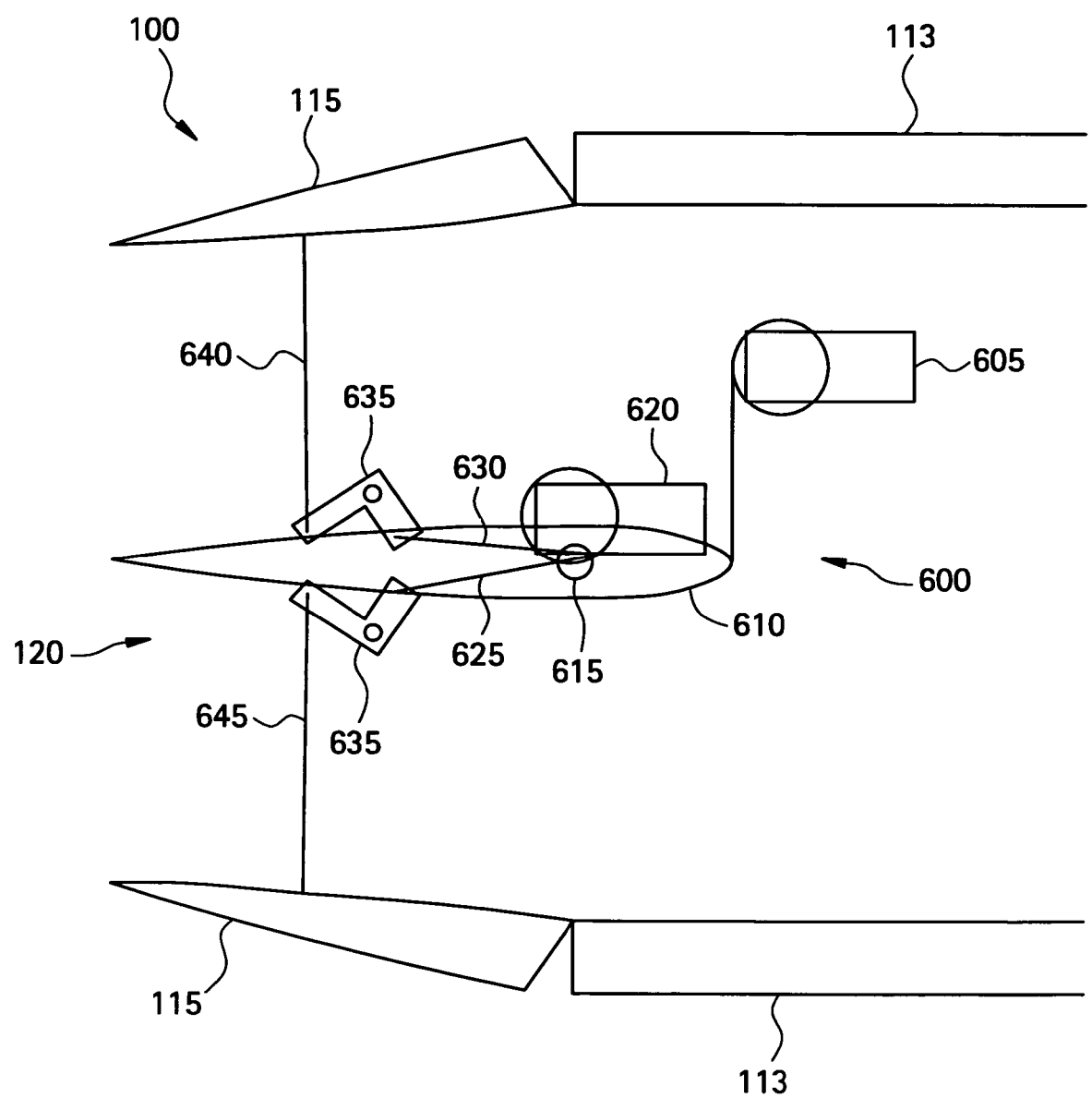

According to an exemplary embodiment, to minimize the loads on the low force, high speed servo mechanism, a mechanical linkage can be used to combine the output of the two types of servos. FIGS. 6A-6C are diagrams illustrating operation of a mechanical linkage 600, in accordance with an exemplary embodiment of the present invention. As illustrated in FIG. 6A, a low force (torque), high speed servo 605 is attached or otherwise coupled to center control vane 610 (of the control vanes 215) by a linkage. The low force, high speed servo 605 can comprise, for example, a rotary-output-type servo or suitable type of servo mechanism. Center control vane 610 is configured to pivot about axis 615 to control pitch (or yaw) of the ducted fan aircraft 100. A high force (torque), low speed servo 620 can also comprise a rotary-output-type servo or other suitable type of servo mechanism. The high force, low speed servo 620 can be located in the duct wall 113, and aligned such that the linkages 625 and 630 attach substantially in line with the axis 615 of center control vane 610. The linkages 625 and 630 can attach or otherwise be coupled to bellcranks 635 or the like. The pivot axis of each bellcrank 635 can be on, for example, a bracket attached to center vane 610 (bracket not shown). The bellcranks 635 can include linkages 640 and 645 that extend to and attach with the respective nozzle vanes 115, which can be pivoted along the periphery of the exhaust end 120 of the duct wall 113.

As illustrated in FIG. 6B, the mechanical linkage 600 can be used to control the various vanes to provide, for example, an elevator deflection of those vanes. In FIG. 6B, the low force, high speed servo 605 can move all three vanes (the two nozzle vanes 115, and the center control vane 610). In such a configuration, the linkages 625, 630, 640 and 645, the bellcranks 635, and the low speed, high force servo 620 can react to the pressure loads, which can be in substantially equal and opposite directions on the nozzle vanes 115. In FIG. 6B, it is noted that the exit area between the trailing (aft) edges of the nozzle vanes 115 has not been substantially altered.

As illustrated in FIG. 6C, the mechanical linkage 600 can be used to alter the exit area of the exhaust end 120 of the ducted fan aircraft 100. In FIG. 6C, the high force, low speed servo 620 has moved. The corresponding linkages 625 and 630 have pulled the nozzle vanes 115 inwards towards the center of the exhaust end 120 to reduce the exit area of the exhaust end 120. It is noted that the pressure loads on the nozzle vanes 115 are still substantially balanced and minimal resulting loads are placed on the low force, high speed servo 605. Other suitable types and configurations of the mechanical linkage 600 can also be used.

Thus, a first servo mechanism, comprising, for example, a high force, low speed servo mechanism, can be configured to handle the (potentially) large pressure load attempting to deflect the nozzle vanes 115 to a larger exit area of the exhaust end 120. In other words, the first servo mechanism can be configured to balance the pressure loads on the plurality of nozzle vanes 115. A second servo mechanism, comprising, for example, a low force, high speed servo mechanism, can be configured to actuate the additional vanes 215 for directional control. Accordingly, the mechanical linkage can be configured to couple both the first and second servo mechanisms to the plurality of nozzle vanes 115 and the additional vanes 215. With such linkage, the first servo mechanism can be used to balance the pressure loads on the nozzle vanes 115, and the second servo mechanism can then be used to move the additional vanes 215 in the same direction for directional control of the ducted fan aircraft 100.

According to an exemplary embodiment, the plurality of nozzle vanes 115 and control vanes 215 should move against the fixed duct wall 113 perpendicular to the hinge line at an end of each nozzle vane 115 and control vane 215. Such a configuration provides for a seal of the outer edges of the nozzle vanes 115 and control vanes 215, so that high pressure air does not leak out around these edges of the nozzle vanes 115 and control vanes 215. Additionally, each of the plurality of nozzle vanes 115 and control vanes 215 can be comprised of continuous span of material. According to an alternative exemplary embodiment, however, as illustrated in FIG. 1, one or more of the plurality of nozzle vanes 115 can comprise a split at approximately a middle of the span so that the nozzle vanes 115 can be deflected differentially. Additionally, as illustrated in FIG. 2, one or more of the control vanes 215 can comprise a split at approximately the middle of the span so that the control vanes 215 can be deflected differentially.

As illustrated in FIG. 1, according to an additional exemplary embodiment of the present invention, a plurality of control surfaces 150 can be movably mounted to the interior of the duct walls 113 that form the fuselage of the ducted fan aircraft 100. The plurality of control surfaces 150 can be mounted near the exhaust end 120, but fore of the plurality of nozzle vanes 115. The plurality of control surfaces 150 can be used, for example, to provide control moments for steering or otherwise controlling the flight path of the ducted fan aircraft 100. According to an exemplary embodiment, as illustrated in FIGS. 1 and 2, the plurality of control surfaces 150 can be mounted substantially perpendicular relative to the plurality of nozzle vanes 115 and control vanes 215. However, the plurality of control surfaces 150 can be mounted at any suitable angle relative to the plurality of nozzle vanes 115 and control vanes 215 to provide, for example, appropriate control of the ducted fan aircraft 100. The plurality of control surfaces 150 can also be controlled by the control circuit 130. For example, each of the plurality of control surfaces 150 can be coupled to suitable servo mechanisms 140 that are configured to deflect the plurality of control surfaces 150. The control circuit 130 can be in electrical communication with the servo mechanisms 140 (e.g., via communications links 133) to control the deflection of the plurality of control surfaces 150 to steer or otherwise control the flight path of the ducted fan aircraft 100. Additionally, each of the plurality of control surfaces 150 can be comprised of a continuous span of material. According to an alternative exemplary embodiment, however, one or more of the plurality of control surfaces 150 can comprise a split at approximately a middle of the span so that the control surfaces 150 can be deflected differentially, for example, for roll control.

As illustration in FIG. 1, the plurality of control surfaces 150 are fully in the air flow 117. However, when deflected, the control surface 150 on one side of the ducted fan aircraft 100 will have its trailing edge move very close to the interior of the duct wall 113. As the trailing edge of the control surface 150 moves closer to the interior of the duct wall 113, the air flow forced through the (narrow) space between the trailing edge and the duct wall 113 can create a "nozzle" effect that can generate high speed air flow. On the opposite side, the trailing edge of the opposing control surface 150 will move away from the interior of the duct wall 113, which can create a diverging air channel. Such a diverging air channel can result in air flow separation and large drag, or it can result in low speed air flow on that side of the ducted fan aircraft 100. Such an air flow distribution can create a moment that counteracts the flow deflection created by the plurality of control surfaces 150.

To address such a situation, exemplary embodiments of the present invention can provide at least two additional control surfaces movably mounted within the ducted fan aircraft 100 fore of the plurality of nozzle vanes 115 near the exhaust end 120 and substantially flush with respective interiors of the duct walls 113 of the ducted fan aircraft 100. These additional control surfaces are referred to herein as "wall rudders," such as, for example, wall rudders 153 and 157. The wall rudders 153 and 157 are connected to the plurality of control surfaces 150 such that the trailing edges of a wall rudder move into the air flow 117 within the ducted fan aircraft 100 when the trailing edge of an adjacent control surface 150 is deflected away from the interior of the duct wall 113.

Figure 3A:
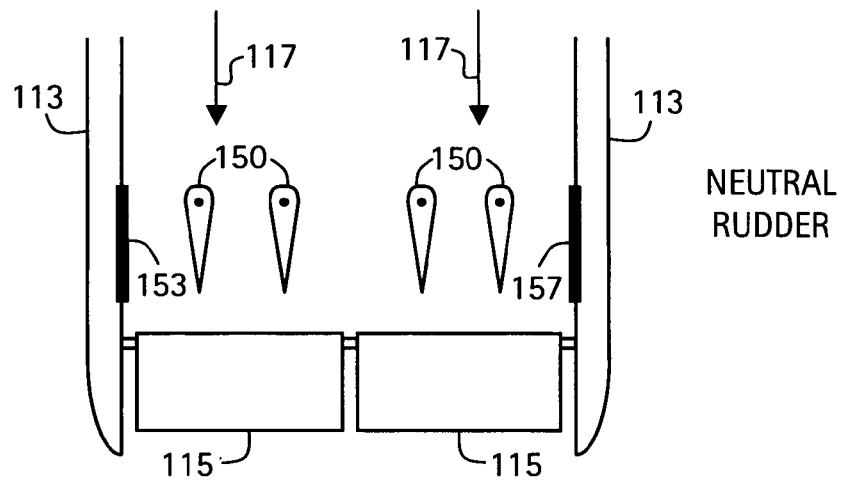
FIGS. 3A-3C are diagrams illustrating the operation of the plurality of control surfaces and wall rudders within the ducted fan aircraft, in accordance with an exemplary embodiment of the present invention.
Figure 3B:
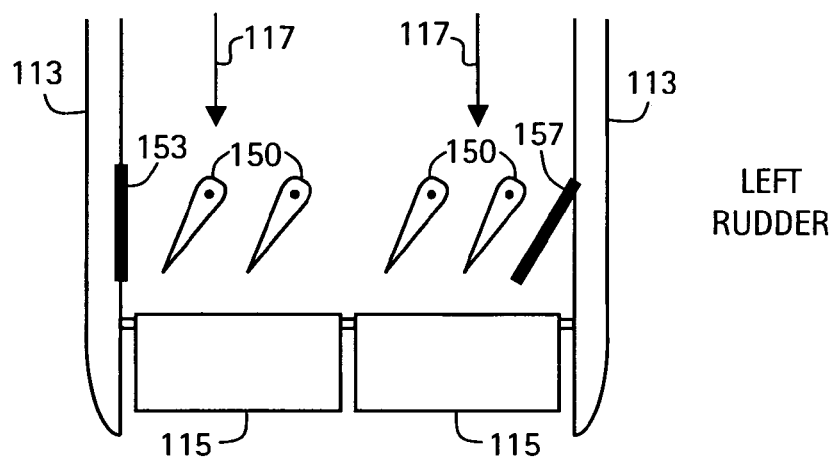
Figure 3C:
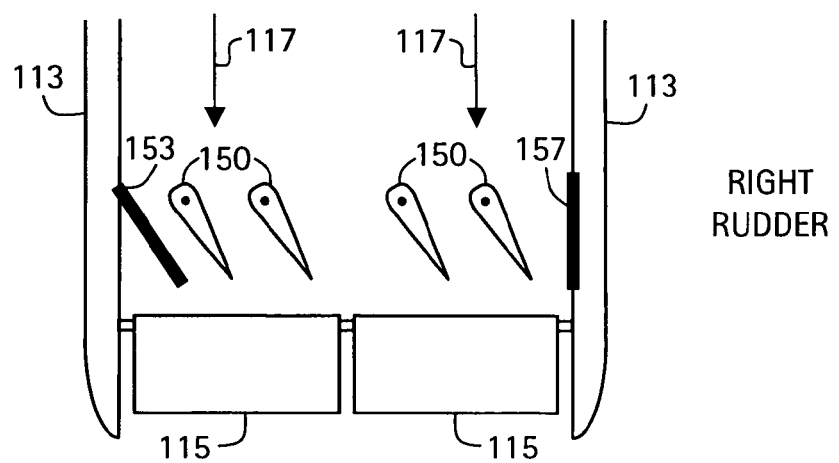

FIGS. 3A-3C are diagrams illustrating the operation of the plurality of control surfaces and wall rudders within the ducted fan aircraft 100, in accordance with an exemplary embodiment of the present invention. In FIG. 3A, the plurality of control surfaces 150 and the wall rudders 153 and 157 are in a neutral rudder position, for example, oriented substantially parallel to air flow 117. In FIG. 3B, the plurality of control surfaces 150 are in a left rudder position. In the left rudder position, the control surface 150 that is adjacent to wall rudder 157 is deflected away from the duct wall 113. According to exemplary embodiments, wall rudder 157 is correspondingly moved into the air flow 117, away from the duct wall 113, in a direction similar to that of the trailing edge of the control surface 150 adjacent to wall rudder 157. However, since the trailing edge of the control surface 150 adjacent to wall rudder 153 has been deflected towards the duct wall 113, the wall rudder 153 remains substantially flush with the interior of the duct wall 113. In FIG. 3C, the plurality of control surfaces 150 are in a right rudder position. In the right rudder position, the control surface 150 that is adjacent to wall rudder 153 is deflected away from the duct wall 113. According to exemplary embodiments, wall rudder 153 is correspondingly moved into the air flow 117, away from the duct wall 113, in a direction similar to that of the trailing edge of the control surface 150 adjacent to wall rudder 153. However, since the trailing edge of the control surface 150 adjacent to wall rudder 157 has been deflected towards the duct wall 113, the wall rudder 157 remains substantially flush with the duct wall 113.

Thus, according to the exemplary embodiment, at least two additional control surfaces (e.g., wall rudders 153 and 157) can be coupled to the plurality of control surfaces 150 such that a trailing edge of one of the at least two additional control surfaces is configured to move into the interior of the ducted fan aircraft 100 when trailing edges of the plurality of control surfaces 150 are deflected away from the respective interior wall of the ducted fan aircraft 100. Accordingly, the deflection of a wall rudder can substantially eliminate the diverging flow channel on that side of the ducted fan aircraft 100 to keep the air flow speed high and the air flow attached.

As illustrated in FIG. 1, the ducted fan aircraft 100 can also comprise a plurality of external vanes or control surfaces 160 movably mounted on the exterior of the ducted fan aircraft 100 at or near the exhaust end 120. For example, the external control surfaces 160 can each be mounted along an outer edge of the substantially rectangular or square exhaust end 120 (e.g., on a corner edge as illustrated in FIG. 2), although the external control surfaces 160 can be mounted at any appropriate location at or near the exhaust end 120 on the exterior of the ducted fan aircraft 100. According to exemplary embodiments, control surfaces on the exterior of the ducted fan aircraft 100 are exposed to the external air flow around the ducted fan aircraft 100. For example, in horizontal cruise flight at low thrust levels, the plurality of control surfaces 150 on the interior of the ducted fan aircraft 100 and the corresponding deflected (interior) air flow can interact with the external control surfaces 160 and the corresponding deflected (external) air flow to provide substantially greater control moments for the ducted fan aircraft 100 compared to conventionally-arranged control surfaces.

For some combinations of deflections, it may be possible for the external control surfaces 160 to hit or otherwise collide with each other at the corners of the substantially rectangular or square exhaust end 120, while leaving large gaps for other combinations of deflections. According to an exemplary embodiment, the external control surfaces 160 can be staggered relative to each other. For purposes of illustration and not limitation, four external control surfaces 160 are illustrated in FIG. 2, comprising two pairs of external control surfaces 160. The external control surfaces 160 within a pair are mounted substantially diagonally from each other on outer corner edges of the substantially rectangular or square exhaust end 120. According to the exemplary embodiment, one of the pairs of external control surfaces 160 can be mounted fore of the other pair of external control surfaces 160 along the exterior of the ducted fan aircraft 100. For example, the trailing edges of the fore external control surfaces 160 can be substantially aligned with the hinge edges of the (aft) external control surfaces 160, although any appropriate alignment can be used. Any suitable number of external control surfaces 160 can be so staggered along the exterior of the ducted fan aircraft 100, for example, along the outer corner edges of the substantially rectangular or square exhaust end 120. Such staggering can allow the external control surfaces 160 to fully deflect in substantially any direction without hitting any other external control surface 160. Additionally, the external control surfaces 160 can be configured for differential deflection, such as, for example, one external control surface 160 in a pair of external control surfaces 160 can differentially deflect relative to the other external control surface 160 in the pair.

Ducted fan aircraft 100, such as, for example, VTOL ducted fan aircraft 100, may require the ability to rapidly and precisely control the thrust of the aircraft. In some circumstances, such thrust control can be performed using appropriate control of the engine throttle. However, such response to such control can be slow and imprecise. According to exemplary embodiments, a plurality of additional control surfaces 173 and 177 can be movably mounted within the ducted fan aircraft 100 fore of the plurality of nozzle vanes 115 near the exhaust end in respective openings 170 in the duct walls 113 of the ducted fan aircraft 100. The control surfaces 173 can be movably mounted on the interior of the duct walls 113 over the openings 170, and the control surfaces 177 can be mounted on the exterior of the duct walls 113 over the openings. The control surfaces 173 and 177 can be mounted flush with the duct walls 113. When closed, as illustrated in FIG. 1, the control surfaces 173 and 177 can seal the openings 170 without adding any drag, being substantially flush with the duct walls 113. However, when open, the control surfaces 173 and 177 can divert at least some of the high pressure air flow 117 from inside the ducted fan aircraft 100 to outside the ducted fan aircraft 100 through the openings 170, thus reducing the thrust.

Figure 4A:
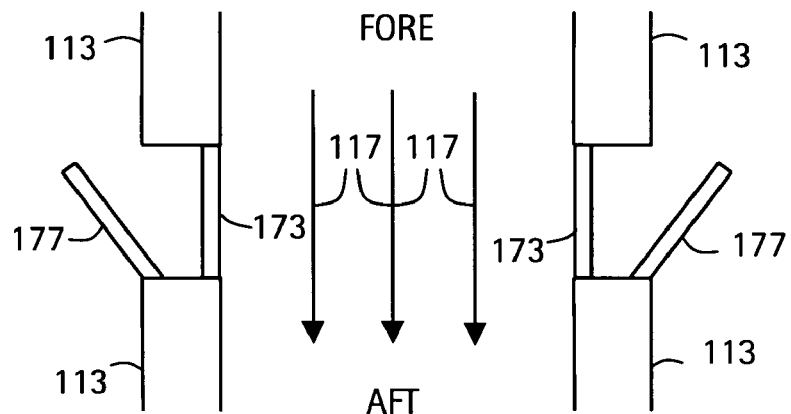
FIGS. 4A-4C are cut-away diagrams illustrating the operation of control surfaces that cover openings in duct walls of the ducted fan aircraft, in accordance with an exemplary embodiment of the present invention.
Figure 4B:
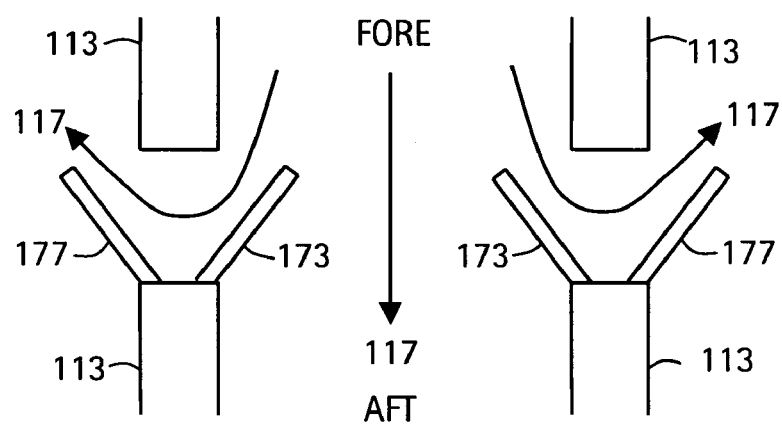
Figure 4C:
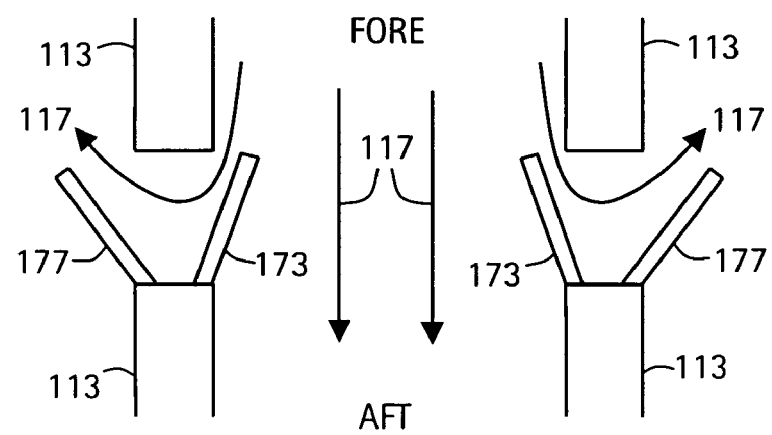

FIGS. 4A-4B are cut-away diagrams illustrating the operation of the control surfaces 173 and 177 that cover the openings 170 in the duct walls 113 of the ducted fan aircraft 100, in accordance with an exemplary embodiment of the present invention. In FIG. 4A, the interior control surfaces 173 are closed, while the exterior control surfaces 177 are open. Although opening the exterior control surfaces 177 may produce some drag, since the interior control surfaces 173 are closed, no high pressure air flow 117 is diverted from inside the ducted fan aircraft 100. In FIG. 4B, both the interior control surfaces 173 and exterior control surfaces 177 are fully open. In such a configuration, at least some of the high pressure air flow 117 is diverted to outside the ducted fan aircraft 100, creating drag to, for example, slow or stop forward motion of the ducted fan aircraft 100. The amount of drag provided by the control surfaces 173 and 177 can be altered by changing the extent to which the control surfaces 173 and 177 are open, thereby controlling the thrust of the ducted fan aircraft 100. For example, in FIG. 4C, the interior control surfaces 173 are partially open, while the exterior control surfaces 177 are fully open. In such a configuration, less high pressure air flow 117 than illustrated in FIG. 4B will be diverted to outside the ducted fan aircraft 100, thereby reducing the thrust less than the configuration illustrated in FIG. 4B. Such "thrust reversing" can be used to quickly and precisely control the thrust of the ducted fan aircraft 100.

According to exemplary embodiments, the control circuit 130 can be configured to actuate the control surfaces 173 and 177 to control the reverse thrust of the ducted fan aircraft 100. For example, the control circuit 130 can receive an indication from the sensor circuit 125 of the thrust being provided by the engine 110 (e.g., a suitable thrust indication signal). Alternatively, the acceleration of the entire ducted fan aircraft 100 can be sensed by, for example, any suitable type of accelerometer or the like, with the acceleration information provided to the control circuit 130. By controlling both the thrust reversing and the exit area of the exhaust end 120 (through the plurality of nozzle vanes 115), the control circuit 130 can control the thrust of the ducted fan aircraft 100 while also maintaining the engine 110 at its optimal RPM. Additionally, control of the plurality of nozzle vanes 115 and control surfaces 173 and 177 can be used to perform rapid take-offs, for example, for VTOL ducted fan aircrafts and the like. For example, the control surfaces 173 and 177 and plurality of nozzle vanes 115 can both be opened so that thrust is minimal and loading of the engine 110 is low. The throttle of the engine 110 can be advanced to full throttle and the engine 110 taken to its maximum allowed RPM. The control surfaces 173 and 177 can then be rapidly closed, with the plurality of nozzle vanes 115 deflected to their optimum settings for flight. Such a rapid change in configuration of the control surfaces and vanes can provide a burst of thrust, above that which can be obtained in steady operation, to get the ducted fan aircraft 100 off the ground quickly. Similarly, on landing, the thrust can be decreased more quickly than by simply closing the engine throttle.

The ducted fan aircraft 100 can include two or more wings 109 mounted to the exterior of the duct walls 113 that form the fuselage of the ducted fan aircraft 100. For example, two wings 109 can be mounted on opposing sides of the fuselage of the ducted fan aircraft 100, although any suitable number of wings can be mounted to the exterior of the fuselage. Although the wings 109 can be rigidly mounted to the fuselage, according to an alternative exemplary embodiment, each wing 109 can comprise a freewing. For example, each freewing can be separately mounted to the fuselage and independently freely pivotable about respective pivot axes, as described in, for example, co-pending and commonly-assigned U.S. patent application Ser. NO. 11/228,351 filed concurrently herewith, and entitled "System and Method for Controlling a Roll Rate of a Torsionally-Disconnected Free-wing Aircraft", the entire contents of which are incorporated by reference herein.

The engine 110 can be any suitable type of engine capable of driving the ducted rotor 105 to propel the aircraft 100, including a gasoline engine, an electric engine, or the like.

The sensor circuit 125 can be located proximate to the engine 110, such as, for example, within an engine block or casing 111 for mounting the engine 110, or any other suitable location within the ducted fan aircraft 100. The connection between the sensor circuit 125 and the engine 110 will depend on the type of circuit used. For example, for an electrical or electronic device, the sensor circuit 125 can be in electrical communication with the engine 110 using any suitable type of electrical connection capable of communicating electrical information. However, for a mechanical or mechanical/electrical device, the sensor circuit 125 can be in mechanical communication with the engine 110 using any suitable type of mechanical connection capable of transferring RPM information to the sensor circuit 125.

The control circuit 130 can be located proximate to the engine 110 and sensor circuit 125, such as, for example, within the engine block or casing 111 with the sensor circuit 125 or any other suitable location within the ducted fan aircraft 100. The control circuit 130 can be any suitable type of electrical or electronic device capable of receiving the RPM signal and outputting a control signal to control the deflection of the plurality of nozzle vanes 115. For example, the control circuit 130 can be comprised of hardware, software, firmware or any suitable combination thereof. The control circuit 130 can be in electrical communication with the servo mechanisms 135 and 140 via communication links 133 using any suitable type of electrical connection that is capable of communicating electrical signals.

Alternatively, either or both of the sensor circuit 125 and control circuit 130 can be comprised of any suitable type of processor, including any type of microprocessor, microcontroller, digital signal processor (DSP), application-specific integrated circuit (ASIC), programmable read-only memory (PROM), erasable programmable read-only memory (EPROM), electrically-erasable programmable read-only memory (EEPROM), or the like. Either or both of the sensor circuit 125 and control circuit 130 can be connected to or include a memory, such as, for example, any type of computer memory or any other type of electronic storage medium, such as, for example, read-only memory (ROM), random access memory (RAM), cache memory, compact disc read-only memory (CDROM), electro-optical memory, magneto-optical memory, or the like. The processor and memory can be used, for example, to perform the functions of either or both of the sensor circuit 125 and control circuit 130.

According to an exemplary embodiment, the ducted fan aircraft 100 can be, for example, a vertical take-off and landing VTOL ducted fan aircraft or the like. However, exemplary embodiments of the present invention can be used in any suitable type of ducted fan aircraft or any appropriate type of aircraft that use one or more ducted fans for propulsion.

FIG. 5 is a flowchart illustrating steps for controlling a RPM of an engine for driving a ducted fan of an aircraft, in accordance with an exemplary embodiment of the present invention. In step 500, the RPM of the engine is detected to generate a RPM signal. In step 510, a plurality of substantially rectangular or square control surfaces (e.g., the plurality of nozzle vanes 115) mounted to the aircraft at a substantially rectangular or square end of the aircraft are actuated in response to the RPM signal. In step 515, the exit area of the exhaust end of the aircraft is altered using the plurality of control surfaces to vary the pressure load on the ducted fan to control the RPM of the engine. In step 520, the RPM of the engine can be controlled. For example, the RPM of the engine can be controlled to maintain the maximum power of the engine for full-throttle flight. Alternatively or additionally, the RPM of the engine can be controlled to maintain the RPM of the engine within a substantially narrow range of values. Alternatively or additionally, the RPM of the engine can be controlled to operate the ducted fan at a substantially optimal forward-speed-to-tip-speed ratio of the ducted fan.

According to an exemplary embodiment, a plurality of control surfaces or vanes, such as control surfaces 173 and 177 illustrated in FIG. 1, can be movably mounted within the aircraft near the exhaust end in respective opening in the duct walls of the aircraft. Accordingly, in step 525, the plurality of control vanes can be actuated to control the reverse thrust of the aircraft.

Some or any combination of the steps of a computer program as illustrated in FIG. 5 for controlling a RPM of an engine for driving a ducted fan of an aircraft can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection including one or more wires, a portable computer diskette, a random access memory (RAM), a read-only memory (ROM), an erasable programmable read-only memory (EPROM or Flash memory), an optical fiber, a portable compact disc read-only memory (CDROM) and the like.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. An aircraft including a ducted fan and an engine for driving the ducted fan, comprising:
a plurality of vanes movably mounted to the aircraft at a substantially rectangular exhaust end of the aircraft,
wherein each of the plurality of vanes is substantially rectangular, and
wherein the plurality of vanes are configured to alter an exit area of the exhaust end;
a sensor circuit configured to detect a RPM of the engine and to output a RPM signal;

a control circuit coupled to the sensor circuit and the plurality of vanes,
wherein the control circuit is configured to actuate the plurality of vanes to alter the exit area of the exhaust end to vary a pressure load on the ducted fan to control the RPM of the engine in response to the RPM signal; and
a first servo mechanism configured to balance pressure loads on the plurality of vanes, wherein
the first servo mechanism comprises a high force, low speed servo;
a second servo mechanism configured to actuate the plurality of vanes, wherein
the second servo mechanism comprises a low force, high speed servo; and
a linkage configured to couple the first and second servo mechanisms to the plurality of vanes.

2. The aircraft of claim 1, wherein the control circuit is configured to control the RPM of the engine to maintain a maximum power of the engine for full-throttle flight.

3. The aircraft of claim 1, wherein the control circuit is configured to control the RPM of the engine to maintain the RPM within a substantially narrow range of values.

4. The aircraft of claim 1, wherein the control circuit is configured to control the RPM of the engine to operate the ducted fan at a substantially optimal forward-speed-to-tip-speed ratio of the ducted fan.

5. The aircraft of claim 1, comprising:
a plurality of control surfaces movably mounted on an interior of the aircraft fore of the plurality of vanes mounted to the aircraft at a substantially rectangular exhaust end of the aircraft.

6. The aircraft of claim 5, comprising:
at least two additional control surfaces movably mounted within the aircraft fore of the plurality of vanes mounted to the aircraft at a substantially rectangular exhaust end of the aircraft and substantially flush with respective interior walls of the aircraft,
wherein the at least two additional control surfaces are coupled to the plurality of control surfaces such that a trailing edge of one of the at least two additional control surfaces moves into an interior of the aircraft when trailing edges of the plurality of control surfaces, adjacent to the one of the at least two additional control surfaces, are deflected away from the respective interior wall of the aircraft.

7. The aircraft of claim 1, comprising:
a plurality of control surfaces movably mounted on an exterior of the aircraft.

8. The aircraft of claim 1, comprising:
a plurality of control surfaces movably mounted on outer corner edges of the exhaust end.

9. The aircraft of claim 1, comprising:
a plurality of sets of control surfaces movably mounted on outer corner edges of the exhaust end.

10. The aircraft of claim 9, wherein the plurality of sets of control surfaces are staggered along the outer corner edges of the exhaust end.

11. The aircraft of claim 9, wherein at least one set of control surfaces is configured for differential deflection.

12. The aircraft of claim 11, wherein the at least one set of control surfaces comprises a split at substantially a middle of a span of the at least one set of control surfaces.

13. The aircraft of claim 9, wherein a first set of control surfaces is mounted fore of a second set of control surfaces.

14. The aircraft of claim 13, wherein a trailing edge of the first set of control surfaces is substantially aligned with a hinge edge of the second set of control surfaces.

15. The aircraft of claim 9, wherein a hinge edge of a first set of control surfaces on an outer corner edge of the exhaust end is substantially aligned with a hinge edge of a second set of control surfaces on an adjacent outer corner edge of the exhaust end, and
wherein the first and second sets of control surfaces are configured to allow unobstructed deflection between the first and second sets of control surfaces.

16. The aircraft of claim 1, comprising:
a plurality of sets of control surfaces,
wherein at least a first set of control surfaces is movably mounted on outer corner edges of the exhaust end, and
wherein at least a second set of control surfaces is movably mounted within the aircraft fore of the plurality of vanes mounted to the aircraft at a substantially rectangular exhaust end of the aircraft.

17. The aircraft of claim 1, comprising:
a plurality of control surfaces movably mounted within the aircraft fore of the plurality of vanes mounted to the aircraft at a substantially rectangular exhaust end of the aircraft in respective openings in walls of the aircraft,
wherein the plurality of control surfaces seal the openings when closed,
wherein the plurality of control surfaces divert air flow from inside the aircraft to outside the aircraft through the openings when open, and
wherein the control circuit is configured to actuate the plurality of control surfaces to control a reverse thrust of the aircraft.

18. The aircraft of claim 1, wherein a duct of the aircraft comprises a substantially circular portion at a location of the ducted fan of the aircraft.

19. The aircraft of claim 1, wherein the aircraft comprises a vertical take off and landing (VTOL) ducted fan aircraft.

20. The aircraft of claim 1, wherein the aircraft comprises a substantially square exhaust end, and wherein each of the plurality of vanes is substantially square.

21. A system for controlling a RPM of an engine for driving a ducted fan of an aircraft, comprising:
a plurality of substantially rectangular control surfaces movably mounted to the aircraft at a substantially rectangular exhaust end of the aircraft,
wherein the plurality of control surfaces are configured to alter an exit area of the exhaust end;
a sensor configured to sense the RPM of the engine and to output a RPM indication signal;
an actuator coupled to the sensor and the plurality of control surfaces,
wherein the actuator is configured to actuate the plurality of control surfaces to alter the exit area of the exhaust end to vary a pressure load on the ducted fan to control the RPM of the engine in response to the RPM indication signal;
a first servo mechanism configured to balance pressure loads on the plurality of control surfaces, wherein
the first servo mechanism comprises a high force, low speed servo; a second servo mechanism configured to actuate the plurality of control surfaces, wherein
the second servo mechanism comprises a low force, high speed servo; and
a linkage configured to couple the first and second servo mechanisms to the plurality of control surfaces.

22. A method of controlling a RPM of an engine for driving a ducted fan of an aircraft, comprising the steps of:
- a.) detecting the RPM of the engine to generate a RPM signal;
- b.) actuating a plurality of substantially rectangular control surfaces movably mounted to the aircraft at a substantially rectangular exhaust end of the aircraft in response to the RPM signal; and
- c.) altering an exit area of the exhaust end using the plurality of control surfaces to vary a pressure load on the ducted fan to control the RPM of the engine, wherein the step of altering is performed by
- a first servo mechanism configured to balance pressure loads on the plurality of control surfaces, wherein
  - the first servo mechanism comprises a high force, low speed servo;
- a second servo mechanism configured to actuate the plurality of control surfaces, wherein
  - the second servo mechanism comprises a low force, high speed servo; and
- a linkage configured to couple the first and second servo mechanisms to the plurality of control surfaces.

23. The method of claim 22, comprising the step of:
- d.) controlling the RPM of the engine to maintain a maximum power of the engine for full-throttle flight.

24. The method of claim 22, comprising the step of:
- d.) controlling the RPM of the engine to maintain the RPM within a substantially narrow range of values.

25. The method of claim 22, comprising the step of:
- d.) controlling the RPM of the engine to operate the ducted fan at a substantially optimal forward-speed-to-tip-speed ratio of the ducted fan.

* * * * *